(No Model.)
C. T. TYLER.
HORSESHOE.
No. 568,055. Patented Sept. 22, 1896.
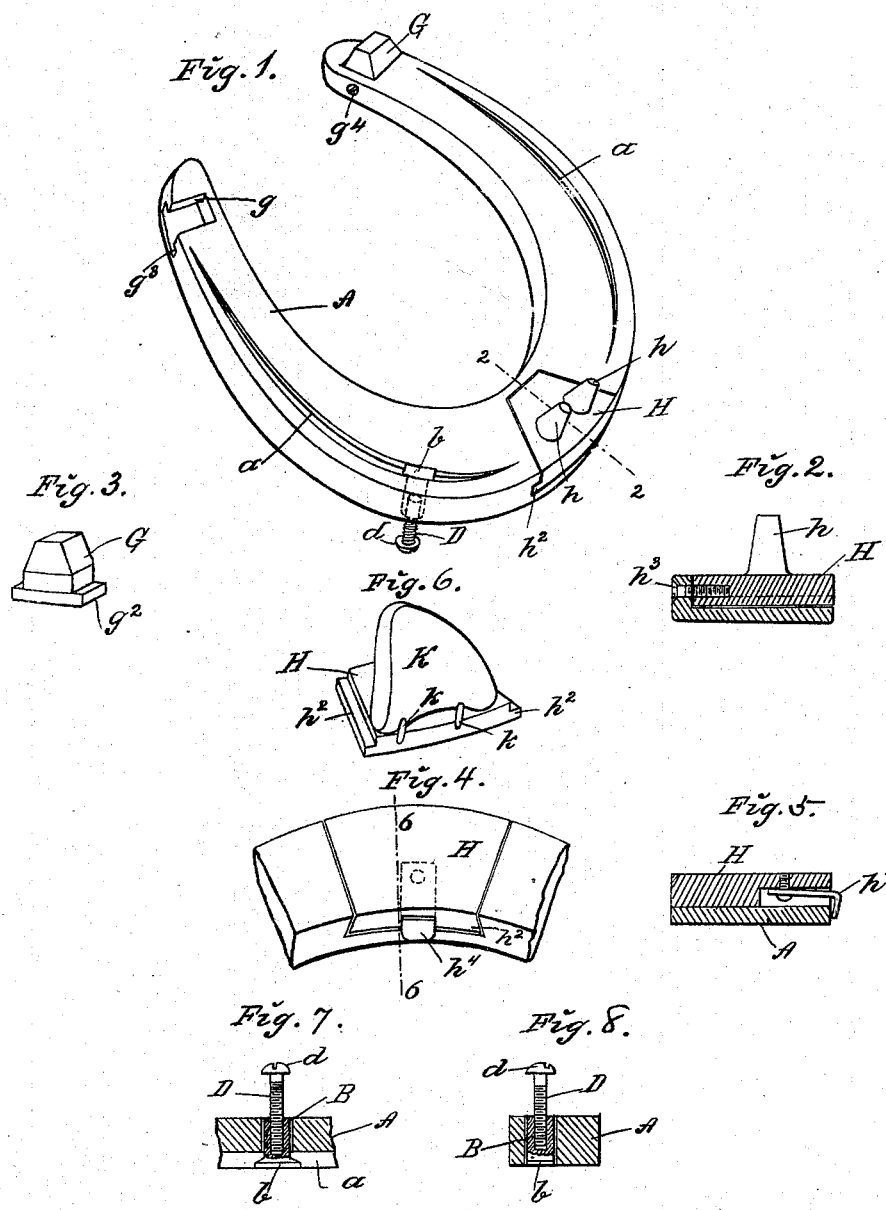
WITNESSES:
INVENTOR
Charles T. Tyler
BY
Edgar Tate & Co
ATTORNEYS.

UNITED STATES PATENT OFFICE.

CHARLES THOMAS TYLER, OF NEW YORK, N. Y.

HORSESHOE.

SPECIFICATION forming part of Letters Patent No. 568,055, dated September 22, 1896.

Application filed February 20, 1896. Serial No. 580,033. (No model.)

*To all whom it may concern:*

Be it known that I, CHARLES THOMAS TYLER, a citizen of the United States, and a resident of New York, in the county of New York and State of New York, have invented certain new and useful Improvements in Horseshoes, of which the following is a specification, reference being had to the accompanying drawings, forming a part thereof, in which similar letters of reference indicate corresponding parts.

This invention relates to horseshoes, and the object thereof is to provide an improvement in this class of devices which consists in improved means for securing the shoe to the hoof or foot of the horse, and also in improved detachable toes and calks for shoes of this class; and with these and other objects in view the invention consists in the construction, combination, and arrangement of parts hereinafter described and claimed.

The invention is fully disclosed in the following specification, of which the accompanying drawings form a part, in which—

Figure 1 is a perspective view of the bottom of a horseshoe made according to my invention; Fig. 2, a section on the line 2 2 of Fig. 1; Fig. 3, a perspective view of a form of heel-calk which I employ; Fig. 4, a perspective view of a modification of the construction shown in Figs. 1 and 2; Fig. 5, a section on the line 6 6 of Fig. 4; Fig. 6, a perspective view of a modified form of the construction shown in Fig. 4, and Figs. 7 and 8 represent improved means which I employ for securing the shoe to the hoof.

In the practice of my invention I provide a shoe A, which is of the usual form, and which is provided with the usual slots $a$, and which are adapted to receive the heads of the nails by which the shoe is secured to the hoof. In my improvement, however, I substitute for the nails the construction shown in Figs. 1, 7, and 8, which consists of short tubes B, having oblong heads $b$, which are adapted to enter the slots $a$, and I also provide screws D, having heads $d$, which are adapted to be passed through the edges of the hoof in holes which are formed therein, and into the tubes B. By means of this construction the shoe may be securely held to the hoof and the danger of injuring the foot, which frequently results from the use of nails, is avoided. I also provide detachable heel-calks G, which are preferably of the form shown in Figs. 1 and 3, and said heel-calks are adapted to be inserted into slots or openings $g$, formed in the ends of the sides of the shoe, and which open outwardly, and this connection is similar to that of a tongue-and-groove joint, the body portion of the heel-calks being provided with a plate $g^2$, which is adapted to enter a corresponding oblong slot $g^3$, with which the slot $g$ communicates, and said heel-calks are held in place by a screw $g^4$, which is passed through the inner portion of the side of the shoe, as clearly shown in Fig. 1. I also provide a detachable toe-calk H, which is connected with the front of the shoe, as shown in Fig. 1, said toe-calk consisting of an irregular-shaped block having lugs or projections $h$ formed thereon, and said block being inserted into a corresponding cavity or recess formed in the shoe, and being held therein by a base-flange $h^2$ and by a screw $h^3$, which is inserted from the inside of the shoe, and in place of this construction I may employ that shown in Fig. 4, in which the toe calk or block H extends entirely through the shoe, and a spring $h^4$ is employed for holding it in position, this construction being best shown in Figs. 4 and 5.

In Fig. 6 I have shown a toe-calk similar to that shown in Figs. 1 and 2, provided with a toe-weight K, which is adapted to be secured to the front thereof by means of wires or loops $k$, and by means of my improvement it will be seen that the calk may be quickly and easily detached from the shoe whenever desired, and that calks of different character may be connected therewith, and it will also be apparent that the calks may be changed without removing the shoe from the foot.

My improved shoe is particularly adapted for use on trotters and other race-horses, and may be made of any desired weight, and when toe weights and calks are not necessary they may be detached therefrom, and when desirable may be again secured in place whenever desired.

Having fully described my invention, I claim as new and desire to secure by Letters Patent—

1. A horseshoe which is provided with the usual slot or groove on the bottom of the sides thereof, and which is held in place upon the foot by short tubes which are passed through the sides of the shoe, and are provided with heads which rest in said grooves, and screws which are passed through the edge of the hoof and into said tubes, substantially as shown and described.

2. A horseshoe which is provided with the usual slot or groove on the bottom of the sides thereof, and which is held in place upon the foot by short tubes which are passed through the sides of the shoe, and are provided with heads which rest in said grooves, and screws which are passed through the edge of the hoof, and into said tubes, said shoes being also provided with detachable calks, substantially as shown and described.

In testimony that I claim the foregoing as my invention I have signed my name, in presence of the subscribing witnesses, this 19th day of February, 1896.

CHARLES THOMAS TYLER.

Witnesses:
C. GERST,
C. G. MILLIN.